(12) United States Patent
Ito et al.

(10) Patent No.: US 7,284,632 B2
(45) Date of Patent: Oct. 23, 2007

(54) AIR DISCHARGE STRUCTURE FOR MOTORCYCLES

(75) Inventors: Masamoto Ito, Saitama (JP); Hideyuki Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 60 days.

(21) Appl. No.: 10/811,786

(22) Filed: Mar. 29, 2004

(65) Prior Publication Data
US 2004/0211610 A1 Oct. 28, 2004

(30) Foreign Application Priority Data
Apr. 1, 2003 (JP) .............................. 2003-098518

(51) Int. Cl.
*B62J 17/00* (2006.01)
*B60K 11/06* (2006.01)
(52) U.S. Cl. ..................... 180/229; 280/68.1; 296/78.1
(58) Field of Classification Search ................ 180/219, 180/225, 229, 68.1, 68.4, 68.6; 280/770, 280/835; 296/78.1
See application file for complete search history.

(56) References Cited

U.S. PATENT DOCUMENTS

| 4,678,223 A | * | 7/1987 | Kishi et al. ............. 296/78.1 |
|---|---|---|---|
| 4,818,012 A | * | 4/1989 | Kohama et al. ........... 296/78.1 |
| 4,830,135 A | * | 5/1989 | Yamashita ................. 180/229 |
| 4,913,256 A | * | 4/1990 | Sakuma ...................... 180/229 |
| 5,915,344 A | * | 6/1999 | Suzuki et al. ............ 123/41.11 |
| 5,984,035 A | * | 11/1999 | Katoh et al. ............... 180/68.1 |
| 2004/0036250 A1 | * | 2/2004 | Kofuji ........................ 280/276 |

FOREIGN PATENT DOCUMENTS

| JP | 7-017449 | * | 1/1995 |
|---|---|---|---|
| JP | 7-228279 | * | 8/1995 |
| JP | 8-142956 | * | 6/1996 |
| JP | 2000118464 | | 4/2000 |

* cited by examiner

*Primary Examiner*—Anne Marie Boehler
(74) *Attorney, Agent, or Firm*—Carrier, Blackman & Associates, P.C.; William D. Blackman; Joseph P. Carrier

(57) ABSTRACT

A motorcycle has a radiator disposed forwardly of the eingine, a raditor cover covering the radiator and having an air discharge port for discharging air from the radiator rearwardly of a vehicle body, and side covers disposed in a position facing the air discharge port and covering both side areas between the fuel tank and the engine, the side covers being contiguous to the rear portion of the vehicle frame and adjacent to the rear wheel suspension. Air discharged from within the radiator cover can be drawn out by ram air that flows along side surfaces of the side covers, to prevent an excessive temperature rise in the radiator cover to the rear portion of the vehicle frame and adjacent to the rear wheel suspension, they are highly blended with each other for an improved appearance.

15 Claims, 7 Drawing Sheets

AIR DISCHARGE STRUCTURE FOR MOTORCYCLES

TECHNICAL FIELD TO WHICH THE INVENTION PERTAINS

The present invention relates to an air discharge structure for a motorcycle.

DISCUSSION OF BACKGROUND ART

There has been known an air discharge structure for a motorcycle which has a radiator cover. See, for example, Japanese Patent Laid-open No. 2000-118464 (pages 2 to 4, FIG. 1, hereinafter "patent document 1").

FIG. 1 of patent document 1 will be described below with reference to FIG. 8 shown below. The reference numerals are assigned anew. FIG. 8 is a side elevational view showing a conventional air discharge structure for a motorcycle. A side area of a radiator 101 is covered with a radiator cover 102, which mixes discharged air from the radiator 101 and fresh air introduced from an inlet port defined in an upper front portion of the radiator cover 102, and emits the mixed air rearwardly of the radiator cover 102. The reference numeral 104 represents a horizontally opposed engine, and 105 carburetors for supplying a fuel to the horizontally opposed engine 104.

The radiator cover 102 is effective to utilize hot air from the radiator 101 and improve the appearance by covering the side area of the radiator 101. However, if there is not much ram air available, then since a high temperature rise occurs in the radiator cover 101, it is necessary to promote the discharging of air from within the radiator cover 102.

As the radiator cover 102 is shaped to cover the side area of the radiator 101 and only part of the carburetors 105 behind the radiator 101, the radiator cover 102 leaves the rear carburetors 105 exposed and is not effective enough to improve the appearance. Particularly, on American-type motorcycles (called "custom motorcycles"), the radiator cover 102 does not match surrounding parts in appearance, and is required to be better blended and harmonized with the engine, the vehicle frame, and the fuel tank around the radiator cover 102.

SUMMARY OF THE INVENTION

It is an object of the present invention to improve an air discharge structure for a motorcycle for promoting the discharging of air from within a radiator and improving the appearance thereof.

To achieve the above object, and according to a first aspect of the invention, there is provided an air discharge structure for a motorcycle having a front wheel suspended on a front portion of a vehicle frame, a rear wheel suspended by a rear wheel suspension mounted on a rear portion of the vehicle frame, a fuel tank mounted on an upper portion of the vehicle frame, an engine mounted on a lower portion of the vehicle frame, a radiator disposed forwardly of the engine, and a radiator cover covering the radiator and having an air discharge port for discharging air from the radiator rearwardly of a vehicle body, wherein a side cover is disposed in a position facing the air discharge port and covers a side area between the fuel tank and the engine, the side cover being contiguous to the rear portion of the vehicle frame and adjacent to the rear wheel suspension.

Since the side cover is disposed so as to face the air discharge port, air discharged from the radiator can be drawn out of the air discharge port by ram air that flows along a side surface of the side cover. Because the side cover is disposed so as to be contiguous to the rear portion of the vehicle frame and adjacent to the rear wheel suspension, the side cover and the rear wheel suspension are highly blended with each other for an improved appearance.

According to a second aspect of the invention, in addition to the first aspect, the side cover projects laterally of the vehicle body from a side surface of the fuel tank as viewed in plan. Because the side cover projects laterally of the vehicle from a side surface of the fuel tank, a leg of the rider of the motorcycle can be applied to the side cover. If the leg is shifted inwardly, then the leg can also be applied to the fuel tank in addition to the side cover, and the force of the leg can be distributed and borne by the fuel tank and the side cover, and the rider can hold the vehicle frame differently depending on the riding posture of the rider.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

Figure 1:
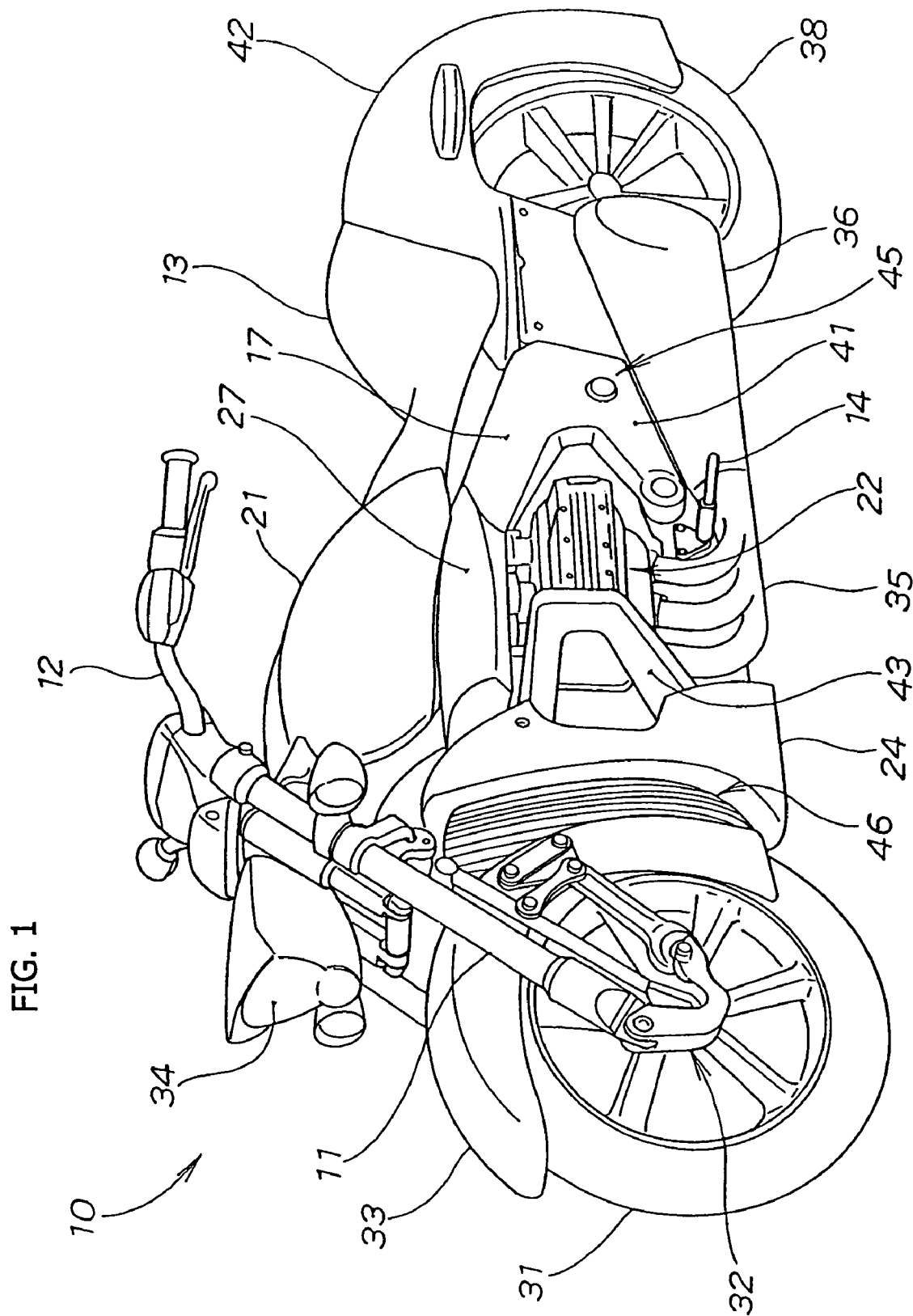
FIG. 1 is a perspective view of a motorcycle incorporating an air discharge structure according to an embodiment of the present invention.

Embodiments of the present invention will be described below with reference to the drawings. The drawings should be viewed in the direction in which the reference numerals look normal.

FIG. 1 is a perspective view of a motorcycle incorporating an air discharge structure according to the present invention. A motorcycle 10 is an American-type motorcycle suitable for long touring, having a front fork 11 which is inclined greatly to position a handle 12 mounted on an upper portion of the front fork 11, rearwardly with respect to a vehicle body, and a seat 13 which is of a low height and steps 14 (only the step 14 on the viewer's side is shown) positioned more forwardly with respect to the vehicle body, so that the rider of the motorcycle can take a comfortable riding posture.

Figure 2:
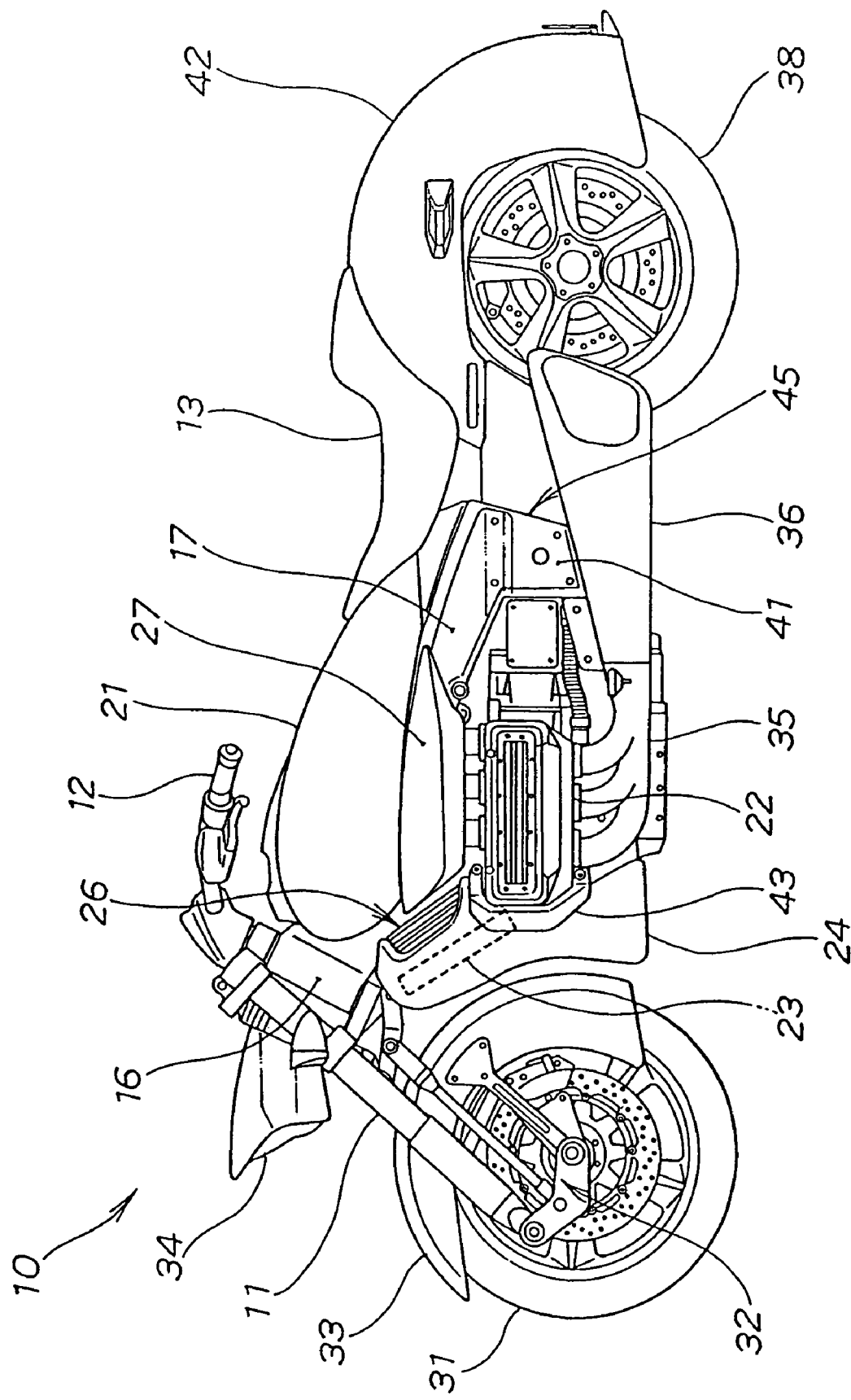
FIG. 2 is a side elevational view of the motorcycle according to the present invention.

FIG. 2 is a side elevational view of the motorcycle according to the present invention. The motorcycle 10 has a main frame 17 extending obliquely rearwardly downwardly from a head pipe 16, a fuel tank 21 mounted on an upper portion of the main frame 17, a horizontally opposed engine 22 mounted on a lower front portion of tyhe main frame 17, a radiator 23 mounted on a lower front portion of the main frame 17 forwardly of the engine 22, a radiator cover 24 covering opposite side areas and an upper area of the radiator 23, and side covers 27 (only the side cover 27 on the viewer's side is shown) disposed in facing relation to an air discharge port 26 defined in the radiator cover 24 and exclusively covering opposite side areas between the fuel tank 21 and the engine 22 rearwardly of the radiator cover.

The reference numeral 31 represents a front wheel connected to the front fork 11 by a link mechanism 32, 33 a front fender covering an upper portion of the front wheel 31, 34 a head lamp, 35, 36 an exhaust pipe and a muffler which are connected to a lower portion of the engine 22, 38 a rear wheel vertically movably mounted by a swing arm (not shown) on a rear wheel suspension 41 mounted on a lower portion of the main frame 17, 42 a rear fender covering an upper portion of the rear wheel 38, and 43 an engine guard disposed forwardly of the engine 22.

The side covers 27 cover engine accessories such as an engine control unit, an ignition unit, etc., and a carburetor which are disposed above the engine 22 and below the fuel tank 21. The side covers 27 are disposed contiguously to the main frame 17 so as to be blended therewith for an improved appearance. The head pipe 16, the main frame 17, and the rear wheel suspension 41 serve as members of a vehicle frame 45.

Figure 3:
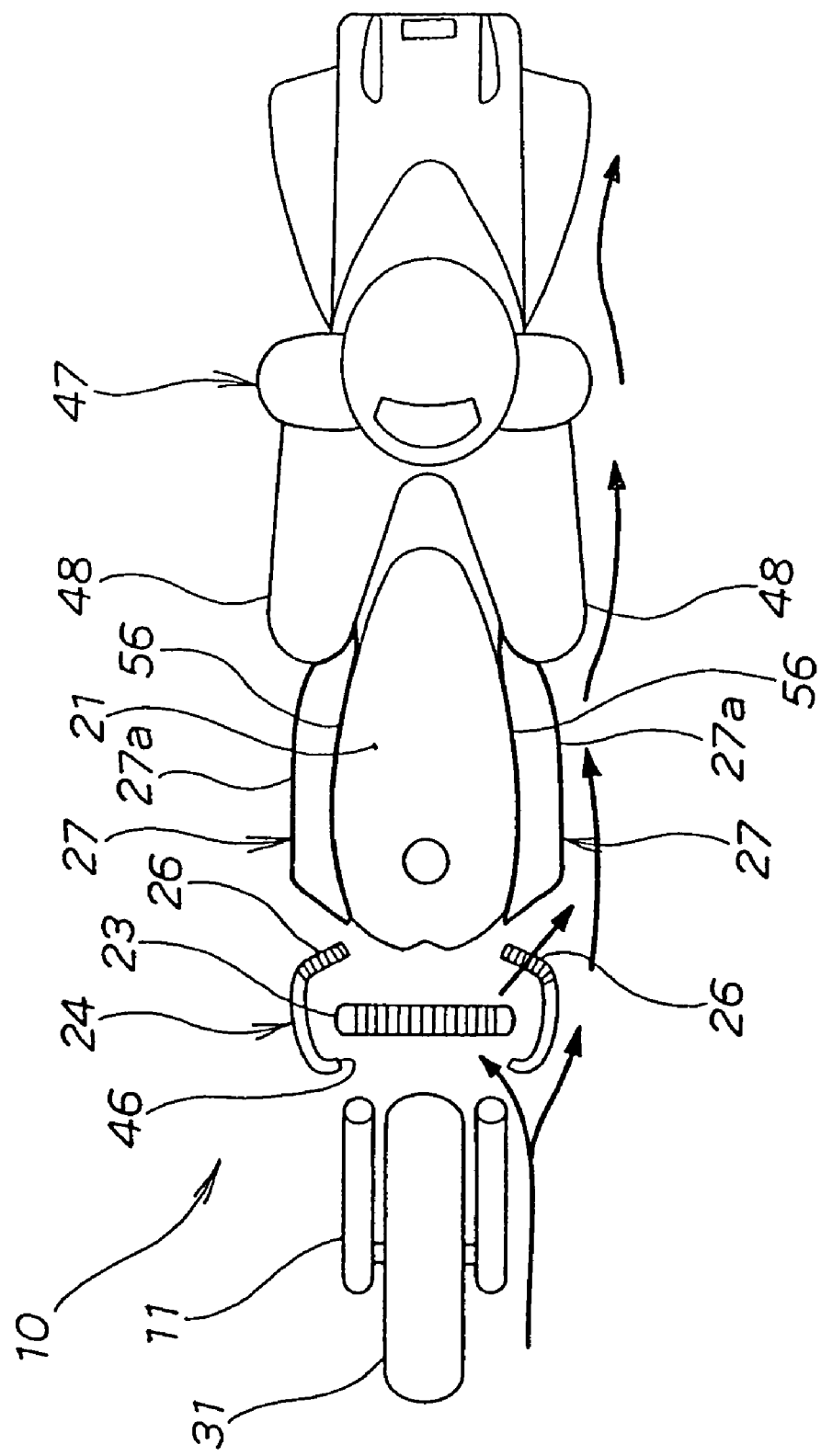
FIG. 3 is a top plan view of the motorcycle according to the present invention.

FIG. 3 is a plan view of the motorcycle according to the present invention, the view showing the motorcycle schematically. Air flows in patterns that are symmetrical on left and right sides of the vehicle body, and only the air flow on one side is illustrated for convenience. The motorcycle 10 has the side covers 27 disposed below opposite sides of the fuel tank 21, and the radiator cover 24 is disposed forwardly of the side covers 27. The reference numeral 46 denotes an air inlet port of the radiator cover 24, and 47 the rider of the motorcycle 10.

While the motorcycle 10 is running, part of the ram air enters the radiator cover 24 from a side of the front wheel 31, passes through the radiator 23, and flows out from the air discharge port 26 of the radiator cover 24.

The ram air also passes from the side of the front wheel 31 alongside of the radiator cover 24, flows along the surface of the side cover 27, passes through a side of a leg 48 of the rider 47, and flows rearwardly of the vehicle body.

At this time, the discharged air flowing out from the air discharge port 26 is drawn laterally from the radiator cover 24 by a pressure drop due to the flow of the ram air alongside of the side cover 27. Therefore, the discharged air can flow out in an increased amount from the air discharge port 26. Therefore, an excessive temperature rise in the radiator cover 24 is prevented from being developed.

Figure 4:
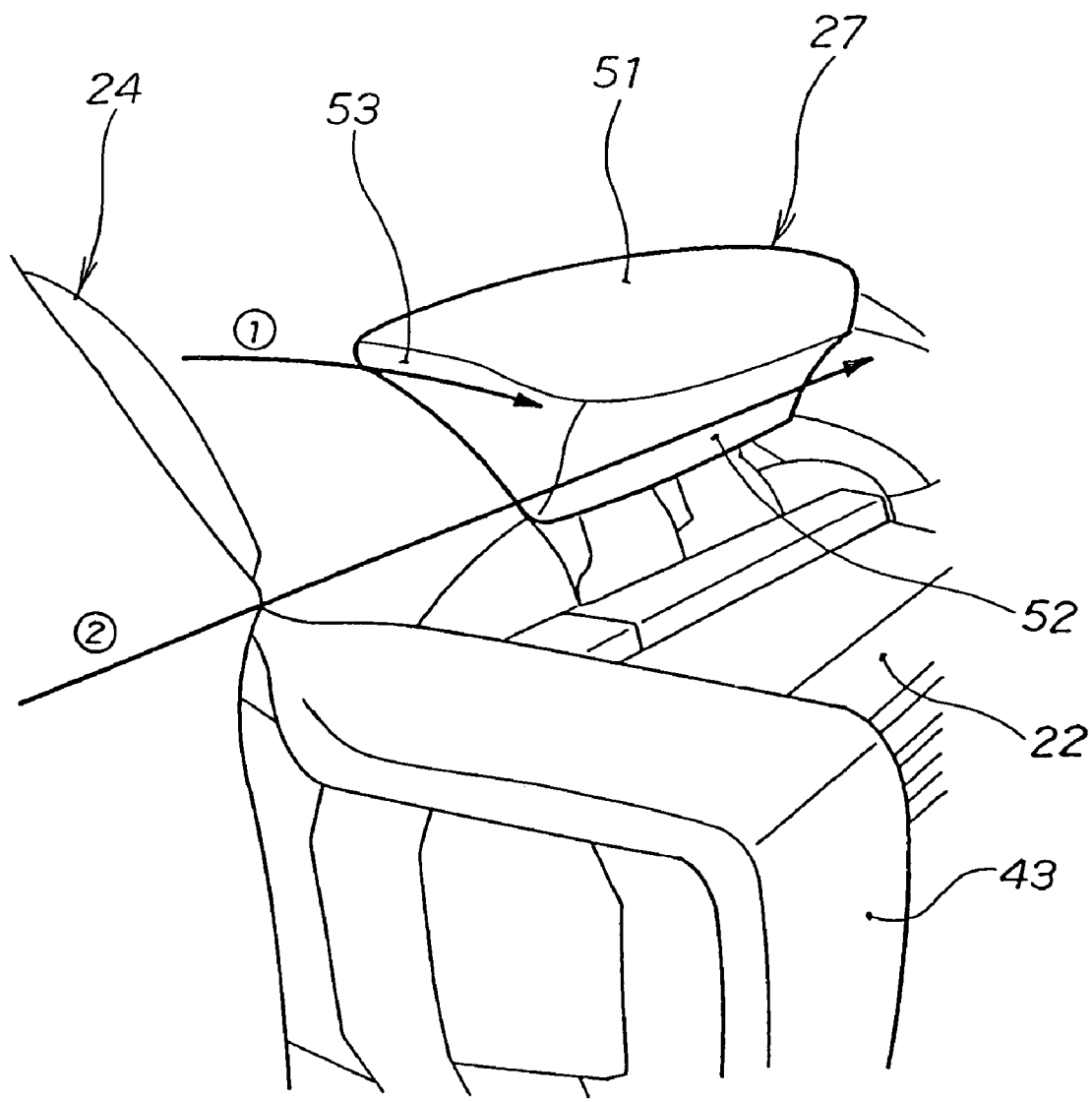
FIG. 4 is a first perspective view showing a side cover and its surrounding parts according to the present invention.

FIG. 4 is a first perspective view showing the side cover and its surrounding parts according to the present invention. The arrow (front) in FIG. 4 represents a forward direction of the vehicle body (this holds true also for other figures).

The side cover 27 has an upper surface 51 which is curved so as to be convex substantially upwardly, a side surface 52 which is curved so as to be concave inwardly, and a front surface 53. The discharged air flowing from the air discharge port 26 (see FIG. 2) of the radiator cover 24 impinges upon the front surface 51 and changes its direction laterally obliquely rearwardly, as indicated by the arrow (1), and is drawn out by ram air which flows laterally of the radiator cover 24 along the side surface 52 of the side cover 27 as indicated by the arrow (2).

Figure 5:
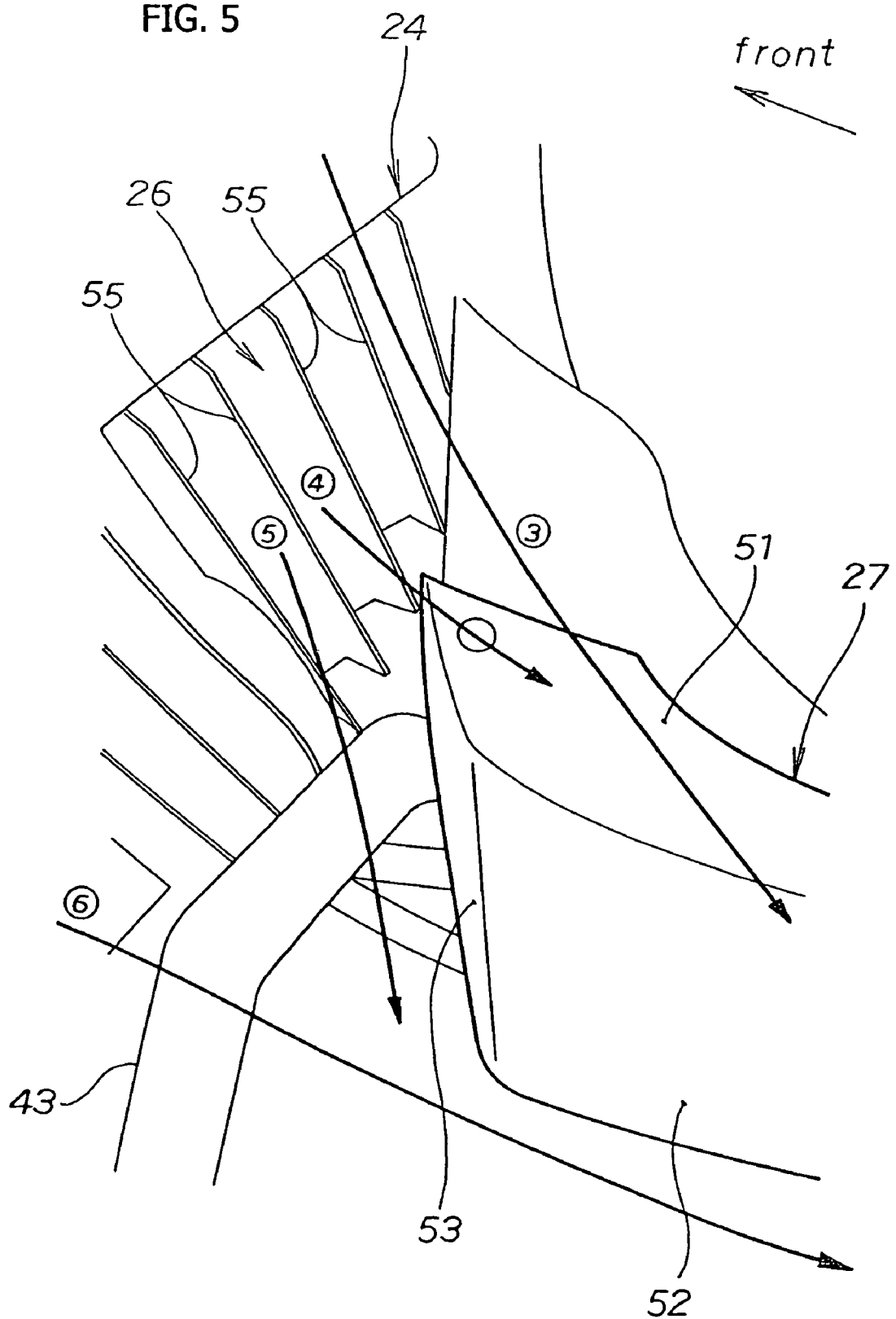
FIG. 5 is a second perspective view showing a side cover and its surrounding parts according to the present invention.

FIG. 5 is a second perspective view showing the side cover and its surrounding parts according to the present invention. The radiator cover 24 has flow regulating plates 55 (represents a plurality. This holds true also for other instances). While the motorcycle is running, air flows indicated by the arrows (3) through (6) are produced around the radiator cover 24 and the side cover 27. Specifically, the arrow (3) represents ram air flowing from above the radiator cover 24 along the upper surface 51 of the side cover 27. The arrow (4) represents discharged air flowing from the air discharge port 26 along the upper surface 51. The arrow (5) represents discharged air flowing from the air discharge port 26 along the front surface 53. The arrow (6) represents ram air flowing laterally of the radiator cover 24 along the side surface 52 of the side cover 27.

Figure 6:
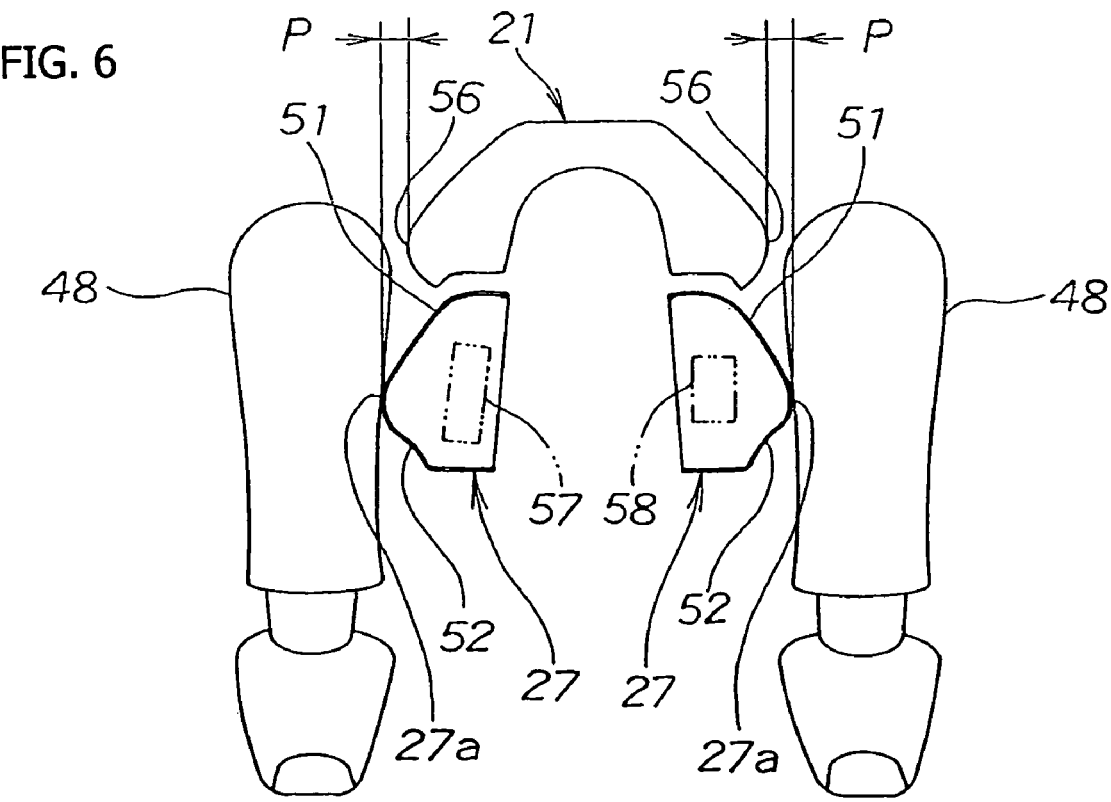
FIG. 6 is a cross-sectional view of a fuel tank and side covers according to the present invention.

FIG. 6 is a cross-sectional view of the fuel tank 21 and the side covers 27 according to the present invention. The side covers 27, specifically, crest portions 27a at the boundaries between the upper surfaces 51 and the side surfaces 52 of the side covers 27, project a distance P laterally of the vehicle body relative to crest portions 56 of side surfaces of the fuel tank 21, and the rider 47 has its legs 48 whose inner sides are applied to the side covers 27, respectively. Therefore, the side covers 27 can be held by the respective legs 48. If the legs 48 are forcibly shifted inwardly, then the sides of the fuel tank 21 as well as the side covers 27 can be held by the legs 48. The force with which the sides of the fuel tank 21 as well as the side covers 27 are held can be distributed to the fuel tank 21 and the side covers 27. Therefore, with the motorcycle 10 according to the present invention, only the side covers 27 may be held by the legs 48 or both the side covers 27 and the fuel tank 21 may be held by the legs 48, depending on the riding attitude of the rider 47.

The reference numeral 57 represents an engine control unit as an accessory for controlling the supply of the fuel to the engine, ignition timing, etc., and 58 an ignition unit as an accessory for enabling spark plugs to produce sparks. The engine control unit 57 and the ignition unit 58 are covered by the side covers 27. Since the engine control unit 57 and the ignition unit 58 are covered by the side covers 27, they are not exposed out, so that the appearance of the motorcycle can be improved.

Figure 7:
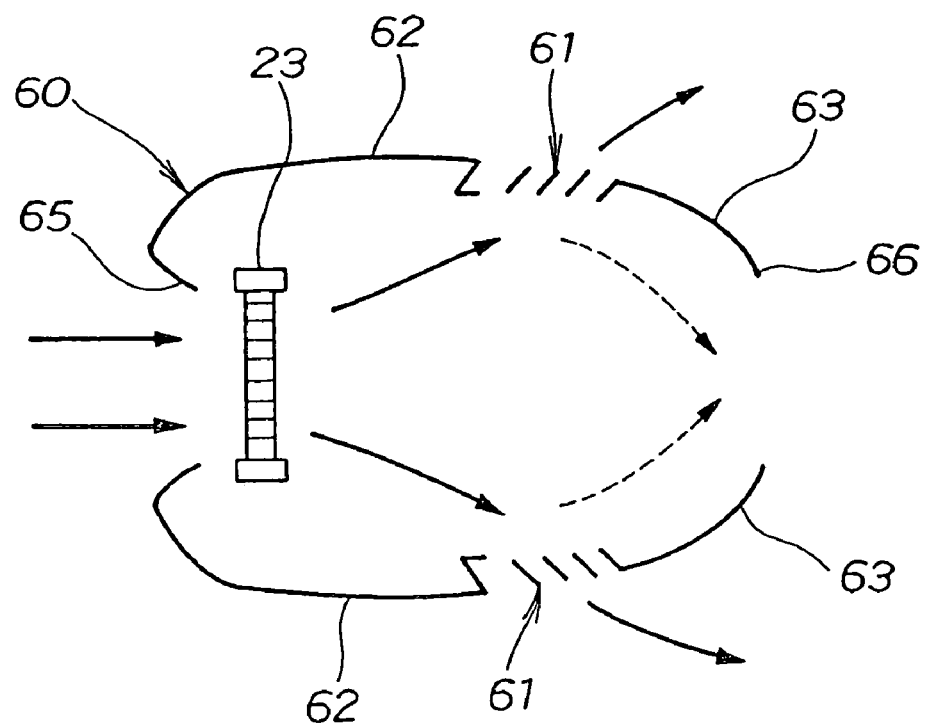
FIG. 7 is a cross-sectional view of an air discharge structure according to another embodiment of the present invention.
Figure 8:
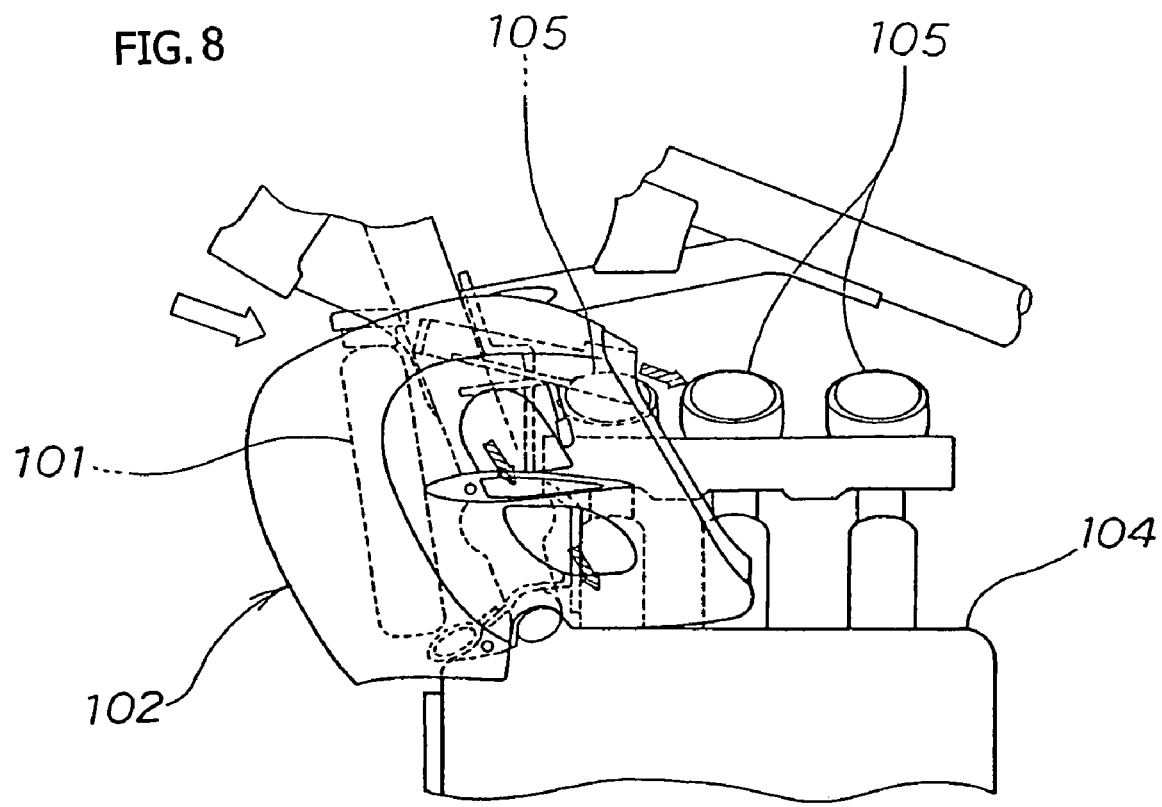
FIG. 8 is a side elevational view showing a conventional air discharge structure for a motorcycle.

FIG. 7 is a cross-sectional view of an air discharge structure according to another embodiment of the present invention, the view showing a body front cover 60 which includes an integral combination of a radiator cover and a side cover. The body front cover 60 includes a radiator cover member 62 covering side areas and an upper area of the radiator 23 and having an air discharge port 61, and a side cover member 63 integrally formed with a rear portion of the radiator cover member 62. The radiator cover member 62 and the side cover member 63 have the same functions as the radiator cover 24 (see FIG. 2) and the side covers 27 (see FIG. 2). The reference numeral 65 represents an air inlet port of the body front cover 60, and 66 a rear opening of the body front cover 60.

The arrows in FIG. 7 show air flows from the body front cover 60 and the air discharge port 61. The broken-line arrows show air that is not discharged from the air discharge port 61 of the body front cover 60, but is directed in the side cover member 63 toward the rear portion of the vehicle body, the air flowing out from the rear opening.

As described above with reference to FIGS. 2 and 3, according to a first feature of the present invention, the motorcycle 10 has the front wheel 31 suspended on a front portion of the vehicle frame 45, the rear wheel 38 suspended by the rear wheel suspension 41 mounted on a rear portion of the vehicle frame 45, the fuel tank 21 mounted on an upper portion of the vehicle frame 45, the engine 22 mounted on a lower portion of the vehicle frame 45, the radiator 23 disposed forwardly of the engine 22, and the radiator cover 24 covering the radiator 23 and having the air discharge port 26 for discharging air from the radiator 23 rearwardly of the vehicle frame, characterized in that the side covers 27 are disposed in a position facing the air discharge port 26, i.e., rearwardly of the air discharge port 26, and cover both side areas between the fuel tank 21 and the engine 22, the side covers 27 being contiguous to the main frame 17 and adjacent to the rear wheel suspension 41.

As the side covers 27 are disposed so as to face the air discharge port 26, air discharged from the radiator 23 can be drawn out of the air discharge port 26 by ram air that flows along a side surface of the side covers 27. Therefore, the discharged air can flow out from within the radiator cover 24 in an increased amount, and an excessive temperature rise in the radiator cover 24 is prevented from being developed.

Because the side covers 27 are disposed so as to be contiguous to the rear portion of the vehicle main frame 17 and adjacent to the rear wheel suspension 41, the side covers 27 and the rear wheel suspension 41 are highly blended with each other for thereby improving the appearance of the American-type motorcycle 10 in particular.

According to a second feature of the present invention, the air discharge structure is characterized in that the side covers 27 cover accessories of the engine 22 as shown in FIGS. 2 and 6. Since the side covers 27 cover accessories of the engine 22, e.g., the engine control unit 57 and the ignition unit 58, the engine control unit 57 and the ignition unit 58 are not exposed out, resulting in a further improved appearance.

According to a third feature of the present invention, the air discharge structure is characterized in that the crest portions 27a of the side covers 27 project laterally of the vehicle body from the crest portions 56 of side surfaces of the fuel tank 21 as viewed in plan. The crest portions 27a of the side covers 27 project laterally of the vehicle body from the crest portions 56 of the side surfaces of the fuel tank 21. Therefore, the legs 48 of the rider 47 can be applied to the side covers 27, respectively. If the legs 48 are shifted inwardly, then the legs 48 can be applied to the fuel tank 21 as well as the side covers 27. The force of the legs 48 can be distributed to the fuel tank 21 and the side covers 27, and the vehicle body can be held by the legs differently depending on the riding attitude of the rider. Since the riding attitude has more freedom, the motorcycle 10 (see FIG. 2) can be handled with increased ease.

The side covers according to the present invention may be contiguous to the radiator cover.

With the above arrangement, the present invention offers the following advantages:

The air discharge structure for the motorcycle according to the first aspect of the invention resides in that the side cover is disposed in a position facing the air discharge port and covers a side area between the fuel tank and the engine, the side cover being contiguous to the rear portion of the vehicle main frame and adjacent to the rear wheel suspension. Therefore, air discharged from the radiator can be drawn out of the air discharge port by ram air that flows along a side surface of the side cover. Therefore, the discharged air can flow out from within the radiator cover in an increased amount, and an excessive temperature rise in the radiator cover is prevented from being developed.

Because the side cover is disposed so as to be contiguous to the rear portion of the vehicle frame and adjacent to the rear wheel suspension, the side cover and the rear wheel suspension are highly blended with each other for thereby improving the appearance of an America-type motorcycle in particular.

The air discharge structure for the motorcycle according to the second aspect of the invention resides in that the side cover covers accessories of the engine 22. The accessories, e.g., the engine control unit, the ignition unit, etc., are not exposed out, resulting in a further improved appearance.

The air discharge structure for the motorcycle according to the third aspect of the invention resides in that the side cover projects laterally of the vehicle body from side surfaces of the fuel tank as viewed in plan. Therefore, a leg of the rider of the motorcycle can be applied to the side cover. If the leg is shifted inwardly, then the leg can also be applied to the fuel tank in addition to the side cover, and the force of the leg can be distributed and borne by the fuel tank and the side cover, and the rider can hold the vehicle frame differently depending on the riding posture of the rider.

Although the present invention has been described herein with respect to specific illustrative embodiments thereof, the foregoing description is intended to be illustrative, and not restrictive. Those skilled in the art will realize that many modifications of the embodiments could be made which would be operable. All such modifications which are within the scope of the claims are intended to be within the scope and spirit of the present invention.

What is claimed is:

1. An air discharge structure for a motorcycle having a front wheel suspended on a front portion of a vehicle frame, a rear wheel suspended by a rear wheel suspension mounted on a rear portion of the vehicle frame, a fuel tank mounted on an upper portion of the vehicle frame, an engine mounted on a lower portion of the vehicle frame, a radiator disposed forwardly of the engine, and a radiator cover covering the radiator and having an air discharge port for discharging air from the radiator rearwardly of a vehicle body, wherein:

a side cover is disposed in a position facing said air discharge port and exclusively covers a side area extending between a lower surface of said fuel tank and an upper surface of the engine, said side cover being contiguous to said rear portion of the vehicle frame.

2. An air discharge structure for a motorcycle according to claim 1, wherein said side cover covers accessories of said engine.

3. An air discharge structure for a motorcycle according to claim 2, wherein said accessories of said engine include at least one of an engine control unit and an ignition unit.

4. An air discharge structure for a motorcycle according to claim 1, wherein said side cover projects laterally of the vehicle body from a side surface of said fuel tank as viewed in plan.

5. An air discharge structure for a motorcycle according to claim 2, wherein said side cover projects laterally of the vehicle body from a side surface of said fuel tank as viewed in plan.

6. An air discharge structure for a motorcycle according to claim 1, including a pair of said side cover disposed on opposite sides of said motorcycle.

7. An air discharge structure for a motorcycle according to claim 1, wherein said side cover has an upper surface curved convex substantially upwardly, a side surface curved concave inwardly and a front surface.

8. An air discharge structure for a motorcycle according to claim 7, wherein said side cover a crest portion at a boundary between said upper and side surfaces, said crest portion projects laterally of the vehicle body from a side surface of said fuel tank as viewed in plan.

9. A motorcycle comprising:
- a front wheel suspended on a front portion of a vehicle frame;
- a rear wheel suspended by a rear wheel suspension mounted on a rear portion of the vehicle frame;
- a fuel tank mounted on an upper portion of the vehicle frame;
- an engine mounted on a lower portion of the vehicle frame;
- a radiator disposed forwardly of the engine;
- a radiator cover covering the radiator and having an air discharge port for discharging air from the radiator rearwardly of a vehicle body; and
- a side cover disposed in a position facing said air discharge port and exclusively covering a side area between said fuel tank and the engine, said side cover being contiguous to said rear portion of the vehicle frame, and wherein said side cover comprises
- an upper surface curved convex substantially upwardly and extending over the longitudinal length of the side cover,
- a side surface curved concave inwardly and underlying the upper surface, and
- a front surface.

10. A motorcycle according to claim 9, wherein said side cover covers accessories of said engine.

11. A motorcycle according to claim 10, wherein said accessories of said engine include at least one of an engine control unit and an ignition unit.

12. A motorcycle according to claim 9, wherein said side cover projects laterally of the vehicle body from a side surface of said fuel tank as viewed in plan.

13. A motorcycle according to claim 10, wherein said side cover projects laterally of the vehicle body from a side surface of said fuel tank as viewed in plan.

14. A motorcycle according to claim 9, including a pair of said side cover disposed on opposite sides of said motorcycle.

15. A motorcycle according to claim 9, wherein said side cover comprises a crest portion at a boundary between said upper and side surfaces, said crest portion projects laterally of the vehicle body from a side surface of said fuel tank as viewed in plan.

* * * * *